(12) United States Patent
Godinez

(10) Patent No.: US 7,089,676 B2
(45) Date of Patent: Aug. 15, 2006

(54) ATTACHING LEVEL

(76) Inventor: Sigifredo Godinez, 13408 Reis St., Whittier, CA (US) 90605

( * ) Notice: Subject to any disclaimer, the term of this patent is extended or adjusted under 35 U.S.C. 154(b) by 0 days.

(21) Appl. No.: 10/994,256

(22) Filed: Nov. 23, 2004

(65) Prior Publication Data

US 2006/0107541 A1 May 25, 2006

(51) Int. Cl.
*G01C 9/28* (2006.01)

(52) U.S. Cl. .......................... 33/371; 33/451

(58) Field of Classification Search ................. 33/371, 33/370, 451, DIG. 1
See application file for complete search history.

(56) References Cited

U.S. PATENT DOCUMENTS

| | | | | |
|---|---|---|---|---|
| 1,153,760 A | * | 9/1915 | Butler | 33/370 |
| 1,617,937 A | * | 2/1927 | Boucher et al. | 33/348.2 |
| 1,778,481 A | * | 10/1930 | Boucher | 33/DIG. 1 |
| 2,535,791 A | * | 12/1950 | Fluke | 33/347 |
| 4,593,475 A | | 6/1986 | Mayes | |
| 5,025,568 A | * | 6/1991 | Grimes | 33/371 |
| 5,063,679 A | * | 11/1991 | Schwandt | 33/347 |
| 5,131,161 A | * | 7/1992 | Drag | 33/533 |
| 5,531,031 A | | 7/1996 | Green | |
| 5,535,523 A | | 7/1996 | Endris | |
| 6,173,502 B1 | | 1/2001 | Scarborough | |
| 6,568,095 B1 | * | 5/2003 | Snyder | 33/370 |
| 6,675,490 B1 | | 1/2004 | Krehel et al. | |

FOREIGN PATENT DOCUMENTS

EP          0 919 786 A1    6/1999

\* cited by examiner

*Primary Examiner*—Christopher W. Fulton
(74) *Attorney, Agent, or Firm*—Richard C. Litman

(57) ABSTRACT

A level is provided with magnets spaced along the length of the level. The magnets function to secure the level to objects such as metal studs, metal beams, metal doorframes and the like when adjusting the attitude of such objects. A spring assembly is provided for each magnet. The spring assembly functions to absorb vibrations released through the object when the object is moved or jostled. The absorption of vibrations allows the magnet to remain in place for a secure attachment to the object.

9 Claims, 5 Drawing Sheets

ATTACHING LEVEL

BACKGROUND OF THE INVENTION

1. Field of the Invention

The present invention generally relates to hand tools. More specifically, the present invention is drawn to a level, which level is provided with magnetic devices for retaining the level in place.

2. Description of the Related Art

Of the many hand tools employed in the construction industry wherein metal framing members are utilized, the level is of paramount importance in that the viability of the entire structure is dependent on the correct horizontal and vertical placement of structural components such as floors, walls, foundations, roofs, etc. Often, the worker needs both hands free while attempting to observe and adjust the attitude of the framing members or other structural components. In such instances, it would surely be advantageous if the level would remain in place so that adjustments could be made and the level vials observed simultaneously. Thus, an inexpensive, easy-to-use, hands-free level would certainly be a welcome addition to the art.

The related art, as cited in the accompanying IDS, is rife with levels having magnetic securing means. However none of the cited inventions and patents, taken either singly or in combination, is seen to disclose a magnetic level as will subsequently be described and claimed in the instant invention.

SUMMARY OF THE INVENTION

The present invention is a level, which level is provided with magnets spaced along the length of the level. The magnets function to secure the level to objects such as metal studs, metal beams, metal door frames and the like when adjusting the attitude of such objects. A spring assembly is provided for each magnet. The spring assembly functions to absorb vibrations released through the object when the object is moved or jostled. The absorption of vibrations allows the magnet to remain in place for a secure attachment to the object.

Accordingly, the instant invention presents an improved level having means for magnetic attachment to the object being leveled. Shock-absorbing structure is employed to absorb vibrations and maintain the attachment of the level to insure reliable, hands-free operation.

The invention provides for improved elements and arrangements thereof for the purposes described which are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
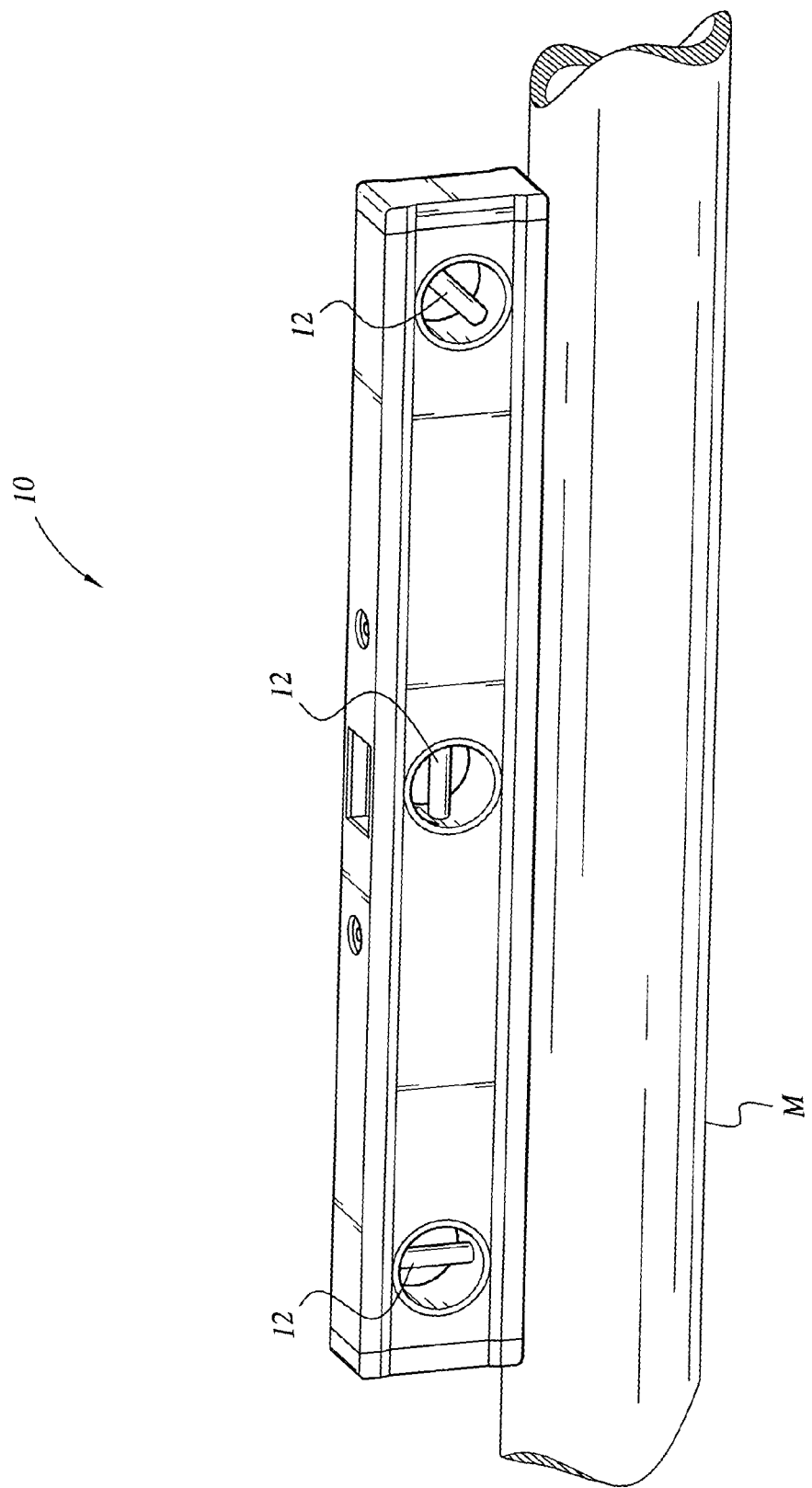
FIG. 1 is an environmental, perspective view of a magnetic attaching level according to the present invention.
Figure 2:
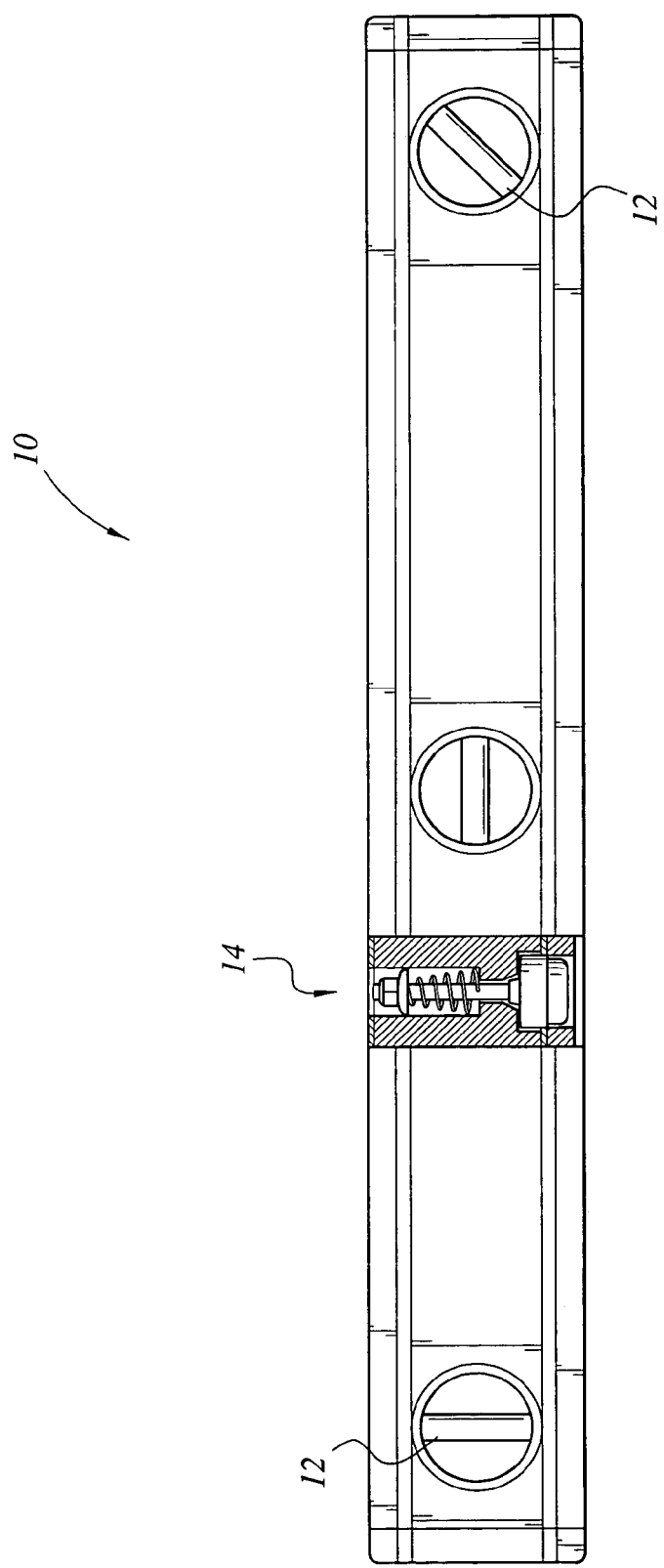
FIG. 2 is a front view, partially cut away, of a magnetic attaching level according to the present invention.

Attention is first directed to FIGS. 1 and 2 wherein the level of the present invention is generally indicated at 10. Level 10 is of rectangular configuration as is common in the art. As illustrated, the level incorporates three conventional, level-indicating vials 12. It should be noted however, that a greater (or lesser) number of leveling vials may be incorporated dependent on the length and/or potential use of the level. The level is mounted on a member M, which member is to be adjusted to a correct attitude. At least one magnet assembly 14 is encapsulated between the front and rear faces of the level.

Figure 3:
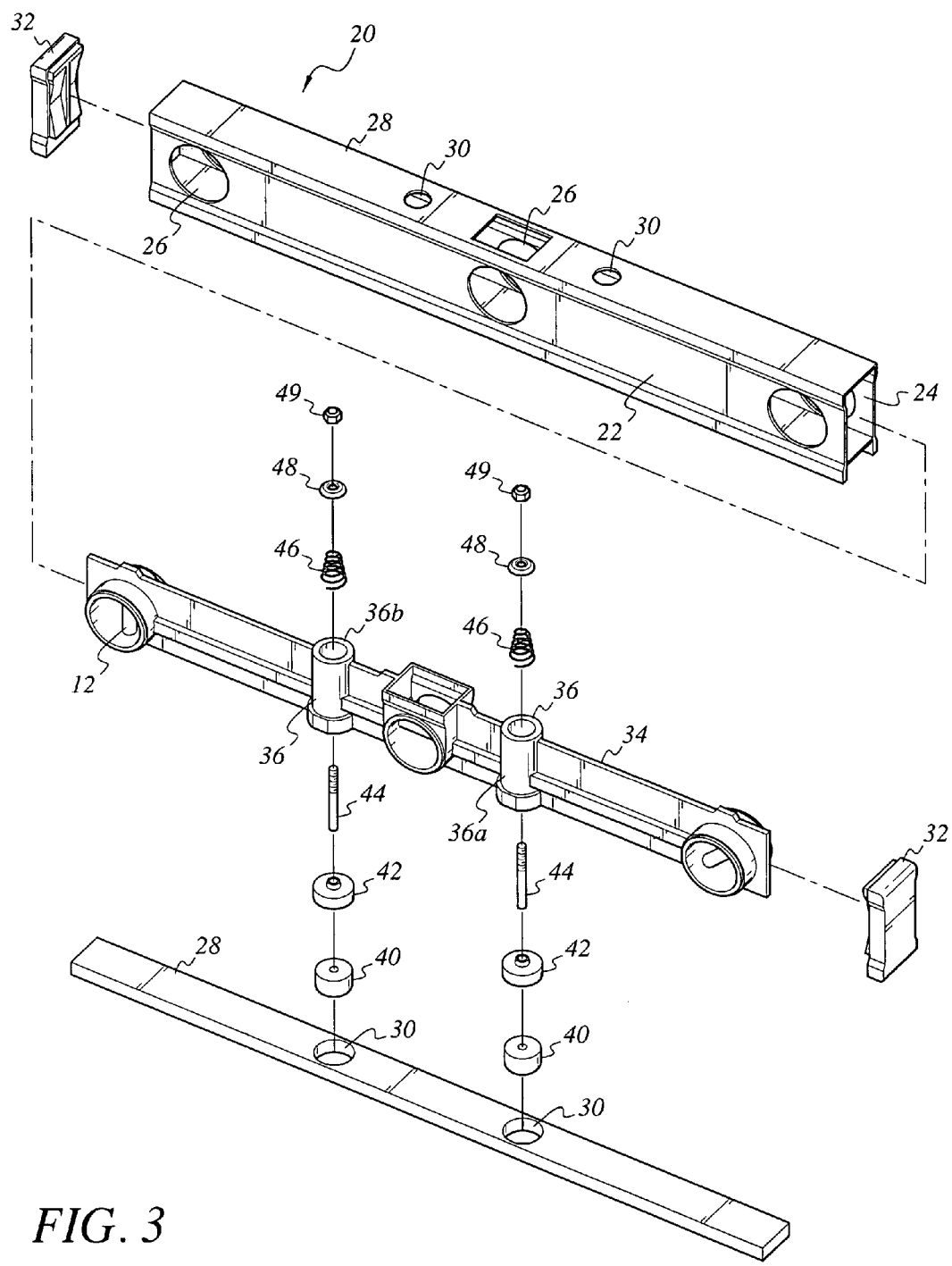
FIG. 3 is an exploded, perspective view of a magnetic attaching level according to the present invention.

As best seen in FIG. 3, level 10 comprises a hollow body member 20 having spaced sides 22 and 24. Sides 22, 24 are provided with coaxially positioned openings 26 to receive and display level-indicating vials 12. Elongate flanges 28 are adapted to close the bottom and top of body member 20. Each flange 28 has aligned openings 30 therein for reasons as will be explained below. End caps 32 are utilized to close the open ends of body member 20. An elongate mounting strip 34 is encapsulated in body member 20. Level-indicating vials 12 are secured in strip 34. Strip 34 also has housings 36 for receiving and containing respective magnet assemblies. Each housing has an open proximate end 36a and an open distal end 36b. Each magnet assembly comprises a permanent magnet 40, a magnet case 42, stem 44, coiled spring 46, washer 48 and self-tightening bolt 49. Housings 36 are aligned with openings 30 so that the magnet assemblies may be accessed for adjustment. As indicated above, the magnet assembly arrangement allows vibration absorption and permits the magnet to remain securely mounted on the construction member being leveled.

Figure 4:
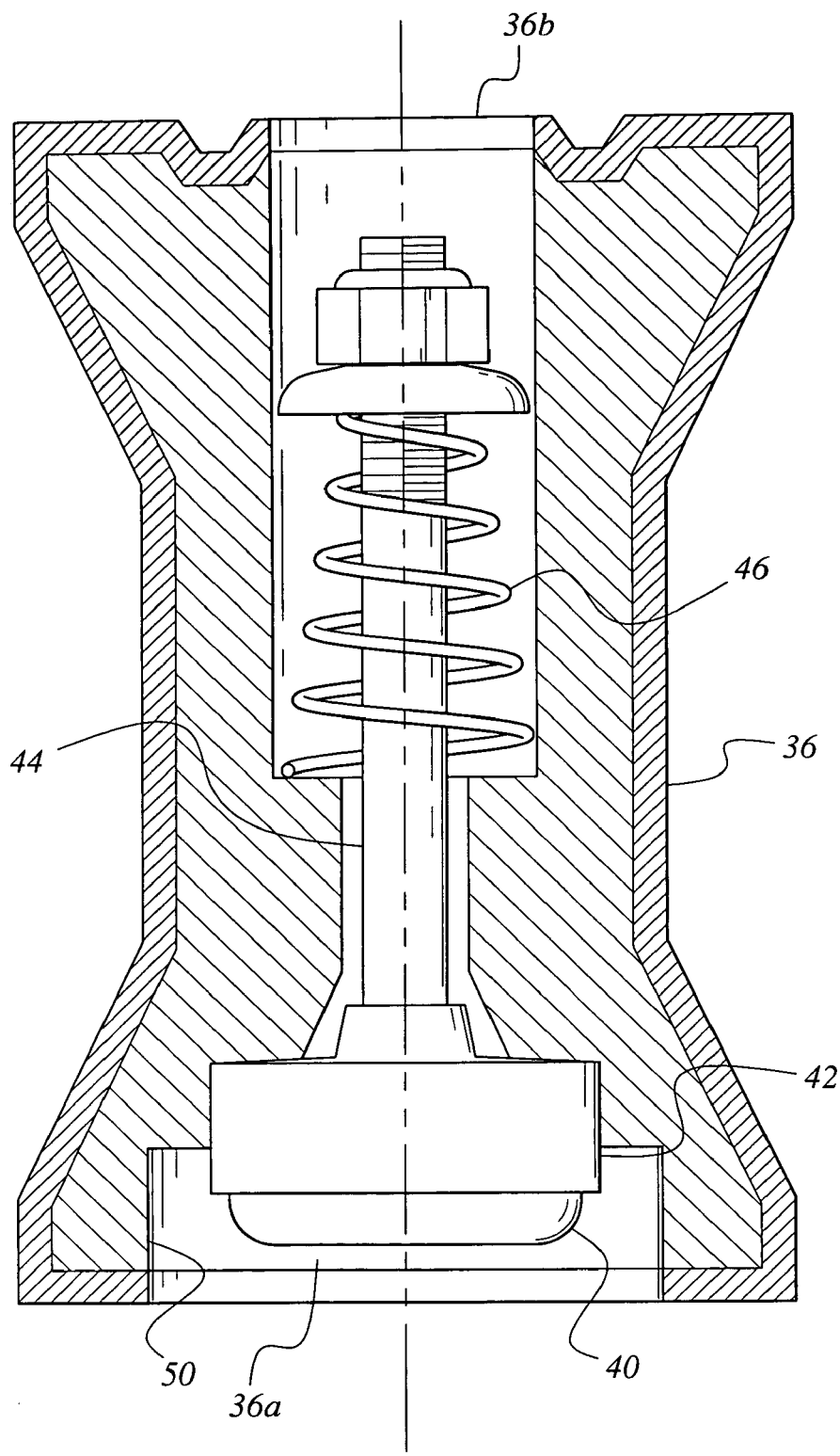
FIG. 4 is a front, cut-away view of a first embodiment of the magnet assembly of a magnetic attaching level according to the present invention.
Figure 5:
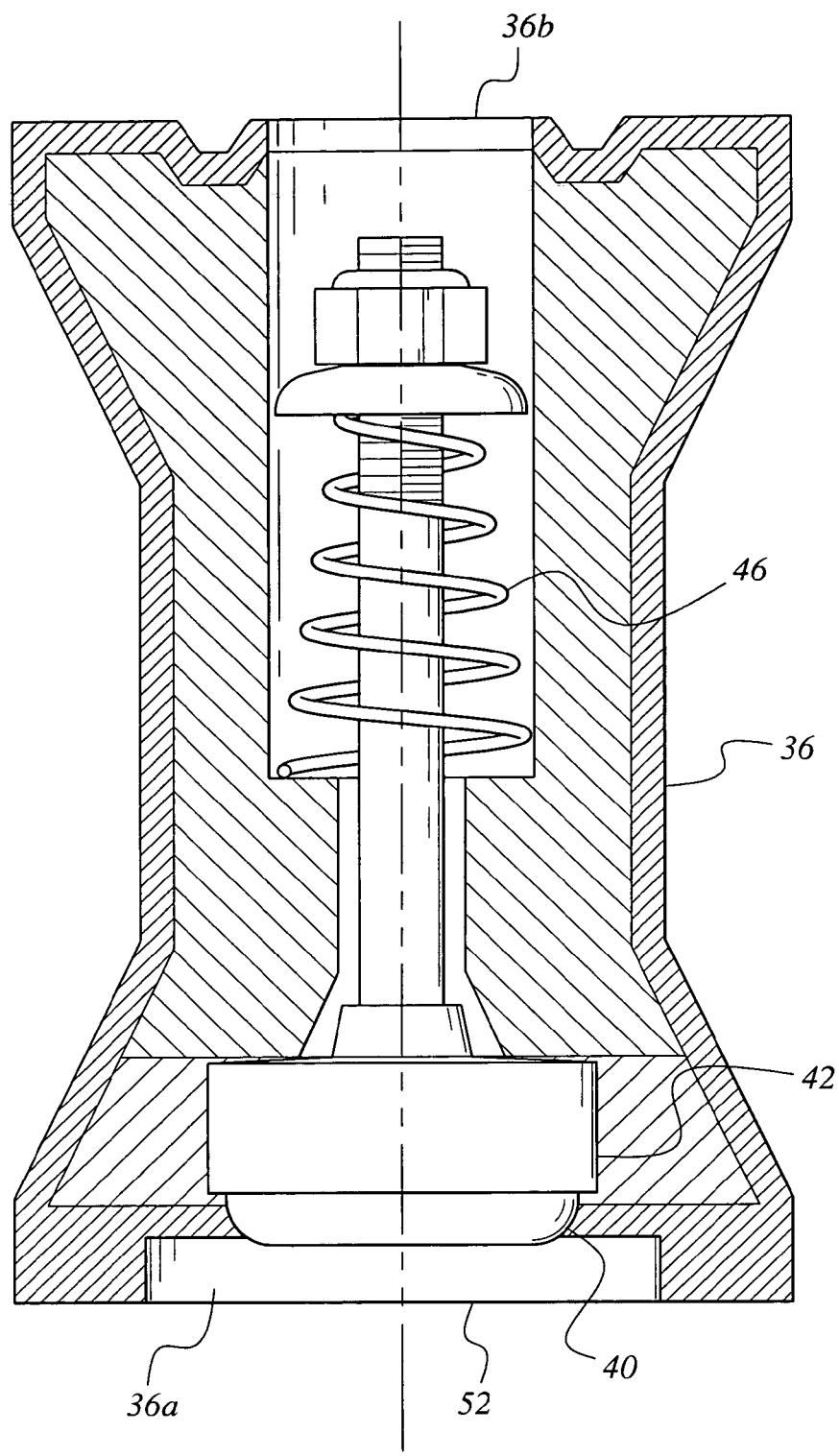
FIG. 5 is a front, cut-away view of a second embodiment of the magnet assembly of a magnetic attaching level according to the present invention.

FIG. 4 is illustrative of the preferred embodiment wherein an offset 50 is formed in housing 36 so that the magnet 40 will directly contact the structural member to be adjusted. In a second embodiment (FIG. 5), a magnetic strip 52 is disposed between the magnet 40 and the structural member to be adjusted.

It is to be understood that the present invention is not limited to the embodiments described above, but encompasses any and all embodiments within the scope of the following claims.

I claim:

1. A magnetic attaching level, comprising:
   a body member having a first side, a second side spaced from said first side defining a hollow interior, an open top, an open bottom and open ends;
   at least one opening formed in each respective first side and second side;
   at least one level-indicating vial encased in said hollow interior and received, in said at least one opening;
   a mounting strip disposed in said hollow interior, said mounting strip having at least one housing thereon, said housing having an open proximate end and an open distal end, and
   at least two magnet assemblies encased in said hollow interior;
   each one of said at least two magnet assemblies includes a stem, said stem having a first end and a second end;

a permanent magnet attached to said first end of said stem; and a coiled spring disposed around said stem and positioned between said first end and said second end forming a vibration absorbing structure; and a magnetic strip disposed to close said open proximate end.

2. The magnetic attaching level as recited in claim 1, including respective flanges mounted to and closing said open bottom and said open top.

3. The magnetic attaching level as recited in claim 1, including respective end caps mounted to and closing said open ends.

4. The magnetic attaching level as recited in claim. 1, wherein said at least one magnet assembly is disposed in said housing.

5. The magnetic attaching level as recited in claim 1, including respective flanges mounted to and closing said open bottom and said open top, each respective flange having at least one opening therethrough.

6. The magnetic attaching level as recited in claim 5, wherein said open proximate end and said open distal end of said mounting strip being aligned with said at least one opening in each respective flange and wherein said at least one magnet assembly is disposed in said housing.

7. The magnetic attaching level as recited in claim 6, wherein said second end of said stem terminates in a threaded portion and wherein a washer and a locknut are positioned on said threaded portion.

8. The magnetic attaching level as recited in claim 7, wherein said washer is disposed in abutment with said coiled spring.

9. The magnetic attaching level as recited in claim 8, wherein an offset portion defines said open proximate end.

\* \* \* \* \*